United States Patent [19]

Mussi et al.

[11] 4,407,688
[45] Oct. 4, 1983

[54] METHOD OF MAKING HELICOPTER BLADE SPARS

[75] Inventors: Fiorenzo Mussi, Milan; Emilio Pariani, Cardano al Campo, both of Italy

[73] Assignee: Costruzioni Aeronautiche Giovanni Agusta S.p.A., Italy

[21] Appl. No.: 337,443

[22] Filed: Jan. 6, 1982

[30] Foreign Application Priority Data

Feb. 5, 1981 [IT] Italy ............................... 67152 A/81

[51] Int. Cl.³ ............................................. B29C 23/00
[52] U.S. Cl. .............................. 156/242; 29/156.8 R; 29/156.8 B; 29/156.8 P; 156/245; 156/250; 156/500; 156/510; 416/226; 416/229 R; 416/230

[58] Field of Search ............... 156/174, 184, 193, 242, 156/245, 250, 500, 510; 416/226, 229, 230, 230 A; 29/156.8 R, 156.8 B, 156.8 P

[56] References Cited

U.S. PATENT DOCUMENTS 3,057,767  10/1962  Kaplan .............................. 156/245
3,943,020   3/1976  Ashton et al. ...................... 416/226

*Primary Examiner*—Caleb Weston
*Attorney, Agent, or Firm*—Kane, Dalsimer, Kane, Sullivan and Kurucz

[57] ABSTRACT

A method for making helicopter blade spars in which a tape of reinforced resin is laid up with a continuous circulatory movement along an annular path defined by a lateral surface of a former of a forming mould in such a way as to define an annular body constituted by two ribs of the spar, rigidly connected together and opposite one another; each rib being subsequently separated from the other by cutting the said annular body.

5 Claims, 7 Drawing Figures

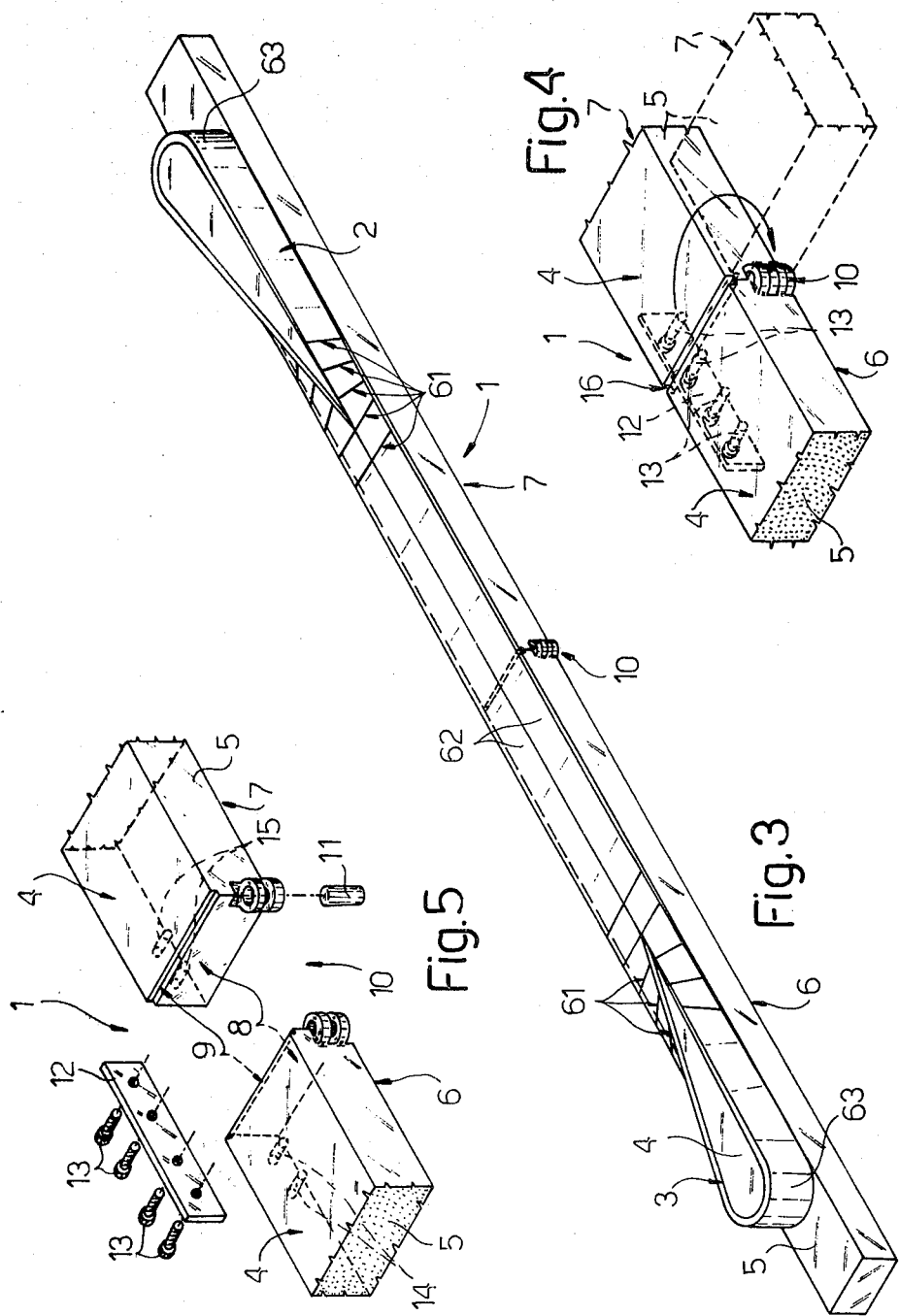

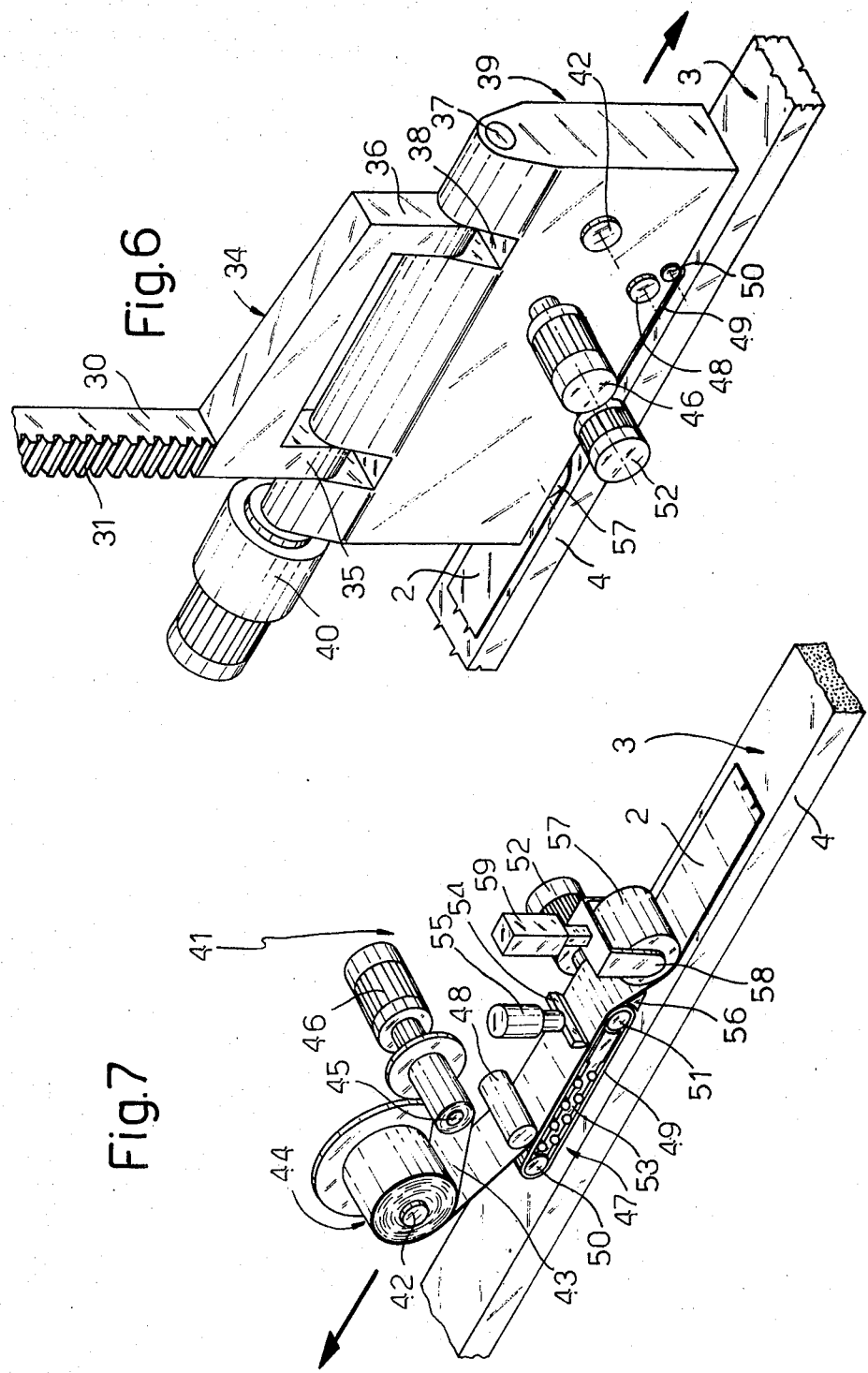

METHOD OF MAKING HELICOPTER BLADE SPARS

BACKGROUND OF THE INVENTION

The present invention relates to a method of making spars for helicopter blades.

Helicopter blades in use today are usually made of a synthetic material and comprise a suction side and a pressure side which are substantially symmetrical with respect to a chord of the blade. The suction side and the pressure side of a blade normally each include two axially adjacent substantially U-shape ribs each constituted by a tape of reinforced resin which is folded in such a way as to form two adjacent substantially rectilinear twisted arms joined together along a curved section. This latter, in the finished blade, surrounds one of the two holes for attachment of the root of the blade to the rooter hob.

The ribs mentioned above are normally made by means of an automatic positioning device which is made to move with a reciprocating movement along a U-shape path to deposit the said tape in contact with the straight sides of a preliminary mould. The rib, once roughly formed on this mould, is transferred to a first forming mould on which the desired twist is conferred to the arms of the rib.

Each rib is then transferred, together with another rib parallel to and alongside it, to the interior of a second forming mould in such a way as to define the suction side or the pressure side of a blade which is subsequently coupled to a pressure side or, respectively to a suction side to define the spar, that is to say the supporting skeleton of the blade itself.

The method desired above has indisputable advantages, the most important of which lies in the simplicity of the automatic positioning device for the tape. In fact, this device does not have to be capable of following the twisted surface of the first forming mould, but only the straight surface of the preliminary mould.

Notwithstanding the above, the known method previously described is not entirely devoid of disadvantages which are due, above all, to the complications involved in the use of several moulds, to the lack of precision normally introduced by the transfer of the tape from the preliminary mould to the forming mould, and by the adjustment to the first forming mould of the tape which has been laid up on the preliminary mould, which adjustment is often performed manually. Another disadvantage is the relatively long time taken for positioning the tape, due to the fact that the tapes are deposited on the preliminary mould with reciprocating displacements of the positioning device which necessarily involve relatively low average speeds.

SUMMARY OF THE INVENTION

The object of the present invention is that of providing a method for making helicopter blade spars which will avoid the above described disadvantages.

The said object is achieved by the present invention in that it relates to a method for making helicopter blade spars, each of the said spars including two pairs of parallel adjacent ribs, in which each of the said ribs is constituted by a tape folded into a substantially U-shape and including two substantially rectilinear twisted arms alongside one another and joined together along a curved section, the method being characterised by the fact that it provides for the use of a double forming mould which permits the simultaneous forming of two of the said ribs rigidly connected together at the free ends of the said arms, and includes the steps of depositing the said tape on the said forming mould with a continuous circulatory motion in such a way as to define an annular body constituted by the said two ribs rigidly connected at their ends, and in subsequently cutting the said annular body on the said mould in such a way as to separate the said two ribs from one another.

In a preferred embodiment of the present invention the above defined method includes the further steps of dividing the said mould into two mould halves in correspondence with the line of separation of the said two ribs, and in turning the said half-moulds with respect to one another to bring them adjacent one another to define a further forming mould for one of the said pairs of ribs.

BRIEF DESCRIPTION OF THE DRAWINGS

Further characteristics and advantages of the present invention will become apparent from the following description with reference to the attached drawings, which illustrate a non limitative embodiment, in which:

FIG. 3 is a perspective view on an enlarged scale of a first detail of FIG. 2;

FIGS. 4 and 5 illustrate, the first in perspective view and the second in exploded perspective view, an enlarged detail of FIG. 3;

FIG. 6 is a perspective view on an enlarged scale of a second detail of FIG. 2; and FIG. 7 is a perspective view of a detail of FIG. 6 with parts removed for clarity.

DETAILED DESCRIPTION OF THE INVENTION

Figure 1:
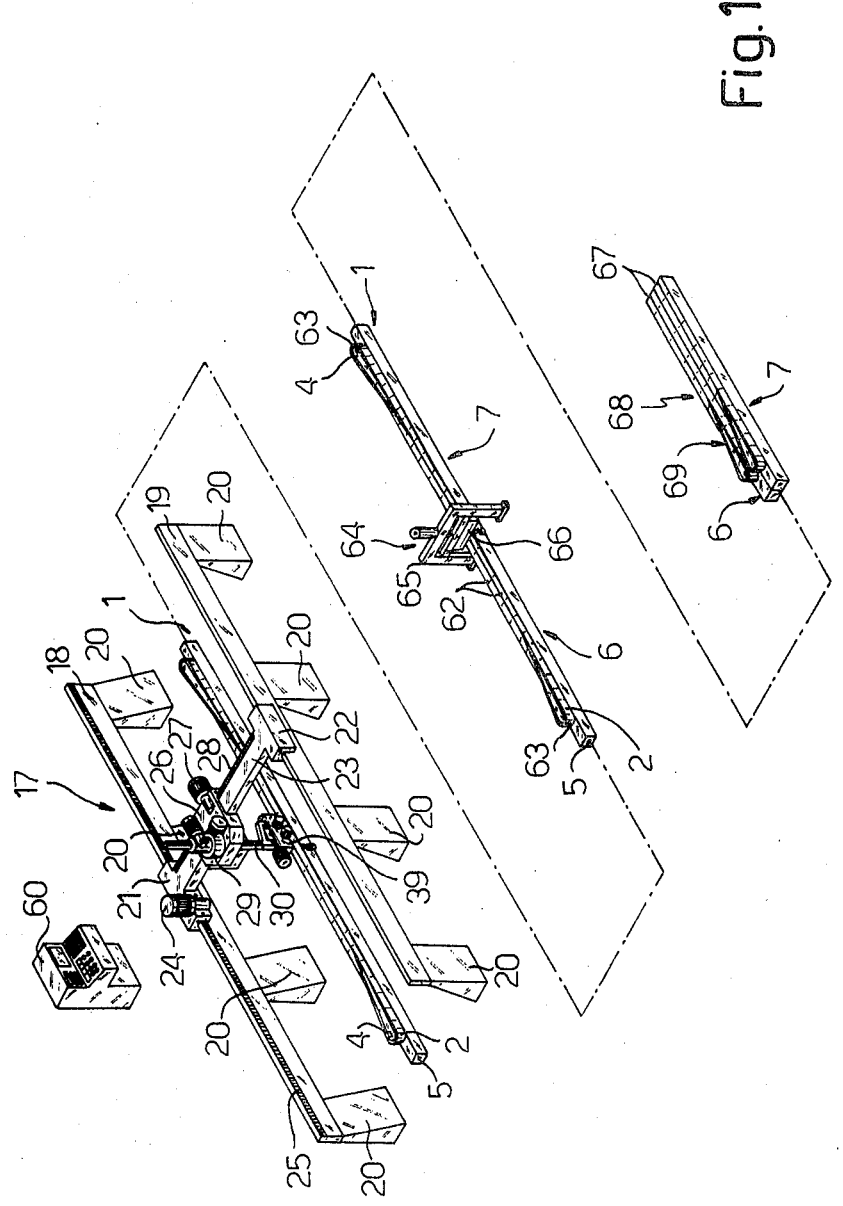
FIG. 1 is a schematic perspective view of a system for the production of helicopter blade spars according to the method of the present invention.

In FIG. 1 and, in particular in FIGS. 3,4 and 5, there is illustrated a forming mould 1 for receiving a tape 2 positioned along an annular path 3 defined by the lateral surface of a shaped former 4 projecting from a support plate 5 of substantially rectangular form.

As illustrated, in particular, in FIGS. 4 and 5, the mould 1 is sub-divided into two halves moulds 6 and 7 each having two flat end surfaces facing one another, each of which has an upper rebate 9. The two surfaces 8 are normally maintained in contact with one another on one side by means of a hinge 10 comprising a pin 11 perpendicular to the plate 5 and located enternally of this latter, and on the other side by a lateral plate 12 connected to the half moulds 6 and 7 means of screws 13 engaged in a removable manner in respective holes 14 of the plate 12 and in respective holes 15 of the plate 5. When the two half moulds 6 and 7 are aligned with one another and joined together the two rebates 9 define a groove 16 extending transversely across the former 4.

Figure 2:
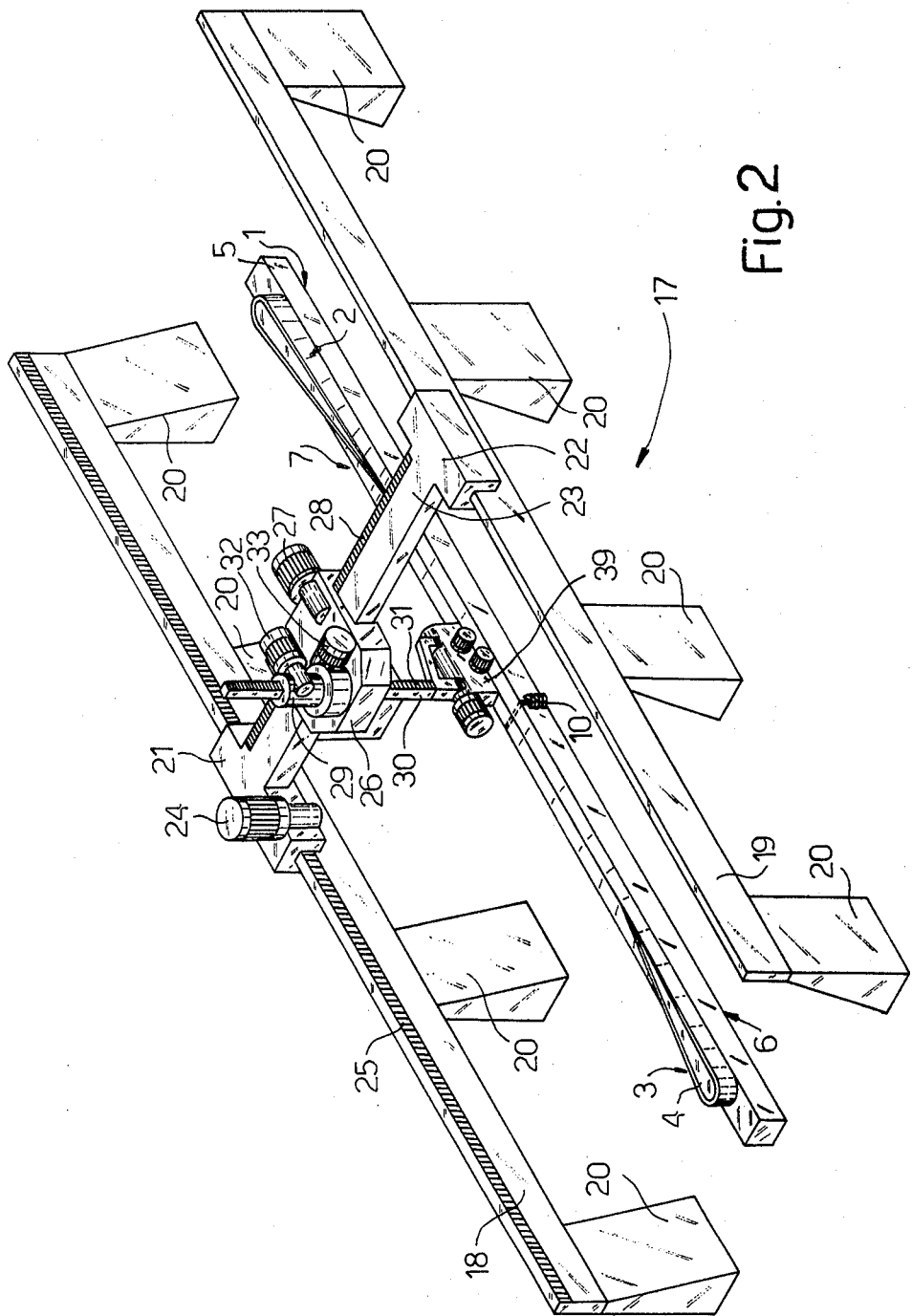
FIG. 2 is a perspective view on an enlarged scale of a detail of FIG. 1 of a machine for the formation of a spar according to the method of the present invention.

The positioning of the tape 2 along the annular path 3 is performed by a positioning machine 17 illustrated schematically in FIG. 2 and including two longitudinal guides 18 and 19 disposed parallel with respect to an axis of the said annular path 3. The guides 18 and 19 have a greater length than that of the path 3 and are supported by uprights 20 above the mould 1. On the guides 18 and 19 there are respectively slidably mounted two slides 21 and 22 rigidly connected together by a crosspiece 23 parallel to the plate 5. The slide 21 is provided with a stepping motor 24 for driving a pinion (not illustrated) coupled to a rack 25 formed on the side of the guide 18.

On the crosspiece 23 there is slidably mounted a slide 26 movable along the crosspiece 23 under the thrust of a stepping motor 27 carried by the slide 26 and operable to drive a pinion (not illustrated) which meshes with a rack 28 extending along the whole of the crosspiece 23.

Through the slide 26 there is formed a through hole (not illustrated) perpendicular to the plate 5 and coaxial with a tubular projection 29 extending upwardly from the slide 26. The said hole and the projection 29 are slidably engaged by a rod 30 on a side surface of which there is formed a rack 31 meshing with a pinion (not illustrated) driven by a stepping motor 32 supported by the tubular projection 29.

The assembly constituted by the projection 29 and the rod 30 can turn about its own axis under the thrust of the stepping motor 33 carried by the slide 26.

As illustrated in detail in FIG. 6, the lower end of the rod 30 is in the form of a fork 34 through the arms 35 and 36 of which there is keyed a pin 37 parallel to the plate 35. The pin 37 is pivotally coupled to an upper wall 38 of a cup shape body 39 positioned with its concavity facing downwardly towards the track 3, and is connected to the output of a stepping motor 40 the casing of which is rigidly connected to the body 39.

Within the body 39 there is mounted a positioning device 41 for the tape 2, illustrated in FIG. 7 and comprising a pin 42 rotatably supported by the body 39 and on which the tape 2 is wound together with a supporting strip of paper 43 to form a reel 44. Next to the pin 42 there is positioned a further pin 45 supported by the body 39 and operated by a stepping motor 46 to rewind the strip 43 and in this way cause the controlled unwinding of the reel 44.

The tape 2 which is unwound from the reel 44 enters into an advancing unit 47 comprising, above the tape, a presser roller 48 rotatably supported by the body 39 and, below the tape, a conveyor 49 having a belt wound in a loop about two rollers 50 and 51 supported by the body 39 and the second of which is driven by a stepping motor 52. Between the two opposite branches of the conveyor 49 there is disposed a roller bed 53 which serves as a reaction plane for a blade 54 operable to cut the tape 2 transversely when driven by a linear actuator 55 rigidly connected to the casing 39.

Downstream from the conveyor 49 there are disposed, in succession, a scraper wedge 56 rigidly connected to the casing 39 and operable to ensure the separation of the tape 2 from the conveyor 49 and a presser roller 57 carried by a fork 58 and movable towards the track 3 under the thrust of a linear actuator 59 rigidly connected to the casing 39.

In use a computer 60 (FIG. 1) controls the motors 24,27,32,33 and 40 in such a way as to displace the body 39 along the path 3 maintaining the lower surface of the belt of the conveyor 49 constantly parallel to the lateral surface of the former 4 and at a relatively small distance therefrom. During this displacement the simultaneous action of the motors 46 and 52 causes the unwinding of the reel 44, the separation of the tape 2 from the supporting paper strip 43 and its deposition onto the conveyor 49. The tape 2 is then advanced by the conveyor 49 from which it is separated by the action of the wedge 56 to be deposited on the lateral surface of the former 4 onto which it is pressed by the action of the roller 57 thrust towards the former 4 by the action of the actuator 59.

In an initial working phase the positioning device 41 is made to advance with a continuous circulatory motion around the loop path 3 in such a way as to deposit several continuous layers of tape 2 onto the lateral surface of the former 4. When the uniform layer deposited reaches a predetermined value and the slides 21 and 22 approach the middle of the associated guides 18 and 19 the computer 60 activates the actuator 55 and simultaneously stops the motors 46 and 52. Activation of the actuator 55 causes lowering of the blade 54 onto the conveyor 49 with a consequent cutting of the tape 2 one cut end of which slides onto the end part of the conveyor 49 and falls onto the lateral surface of the former 4 onto which it is pressed by the roller 57, whilst the other cut end remains fixed on the conveyor 49.

The motors 46 and 52 remain stationary until the device 41 reaches a predetermined position where deposition of the tape 2 resumes.

By forming, as illustrated in FIG. 3, a series of cuts 61 on each side of the former 4, successively at greater distances from the mid point thereof, it is possible to cover the lateral surface of the former 4 with a layer formed as a loop which comprises two intermediate sections 62 which are twisted and parallel to one another and joined by two curved sections 63, and having a thickness which increases progressively and gradually towards the curved section 63.

As illustrated in FIG. 1, the annular layer of tape 2 described above is cut, at the mid point of the sections 62, by means of a cutting device 64 comprising a yoke 65 supporting a vertical blade 66 beneath which the mould 1 is first positioned. During the cutting the blade 66 penetrates through the tape 2 until it engages in the groove 16 in such a way as to define two ribs 67 of a spar (not illustrated) of a helicopter blade (not illustrated).

Once the annular layer of tape 2 has been cut, the plate 12 is taken off in such a way as to free the two half moulds 6 and 7 which, as illustrated in FIG. 1, are then turned with respect to one another about the axis of the pin 11 to assume a side-by-side configuration in which they define a new former mould 68 for the suction side or pressure side 69 of the said spar (not illustrated).

What is claimed is:

1. A method of making spars for helicopter blades, each said spar comprising two pairs of ribs (64) lying parallel to and alongside one another, in which each said rib (64) is constituted by a tape (2) folded into a substantially U-shape and comprising two substantially rectilinear twisted arms lying alongside one another and joined together by a curved section (63), the method being characterised by the fact that it utilises a double forming mould (1) which can permit the simultaneous forming of two of the said ribs (64) opposite one another and joined together at the free ends of the said arms, and includes steps consisting in the deposition of the said tape (2) onto the said forming mould (1) with a continuous circulating movement in such a way as to define an annular body constituted by the said two ribs (64) opposite one another and rigidly joined together, and in subsequently cutting the said annular body on the said mould (1) in such a way as to separate the said two ribs (64) from one another, separating the said mould (1) into two half moulds (6,7) at the line of cut separating the said two ribs (64), and in turning the said half moulds (6,7) with respect to one another to bring them alongside one another to define a further forming mould (68) for one of the said pair of ribs (64).

2. A method according to claim 1, characterised by the fact that the said mould (1) includes two half moulds (6,7) opposite to and aligned with one another; one end (8) of each said half mould (6,7) being connected to one end (8) of the other half mould on one side by means of a lateral hinge (10) and on the other side by means of removable connection means (12,13).

3. A method according to claim 1, characterised by the fact that the said step of deposition of the tape (2) is performed by a positioning machine (17) comprising two guides (18,19) disposed on opposite sides of the said mould (1), a crosspiece (23) movable along the said guides (18,19) above the said mould (1), and a positioning device (41) connected to the said crosspiece by means of a support (30) which is rotatable with respect to the said crosspiece (23) about a first axis of rotation perpendicular thereto and to the said guides (18,19), and movable with respect to the said crosspiece (23) along the said axis of rotation; the said positioning device (41) being connected to the said support (30) to rotate with respect thereto about a second axis of rotation perpendicular to the said first axis of rotation.

4. A method according to claim 3, characterised by the fact that the said positioning device (41) includes a support reel (44) for the said tape (2), a belt conveyor (49) disposed beneath the said reel (44), unwinding means (45,46) for unwinding the said tape (2) from the said reel (44) onto the said conveyor (49), actuator means (52) connected to the said conveyor (45) for making it advance at the speed of unwinding of the said unwinding means, and cutting means (54) disposed above the said conveyor (49) and operable to cooperate with this latter for cutting the said tape (2).

5. A method according to claim 3, characterised by the fact that the said positioning means is controlled by a logic unit (60).

* * * * *